Feb. 17, 1925.  
A. T. SAMPSON  
SWITCH BOX  
Filed Feb. 6, 1920  
1,526,870  
3 Sheets-Sheet 1
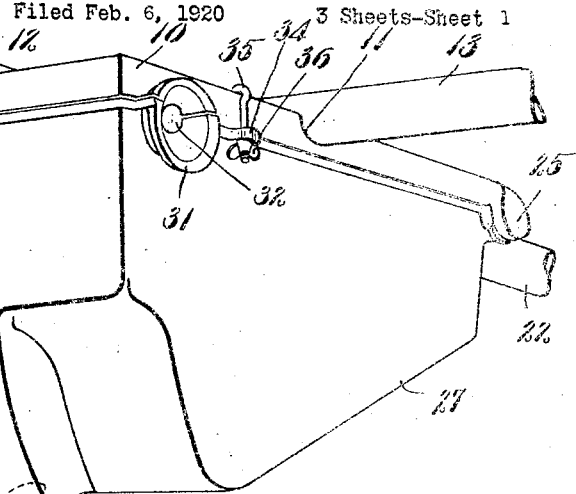
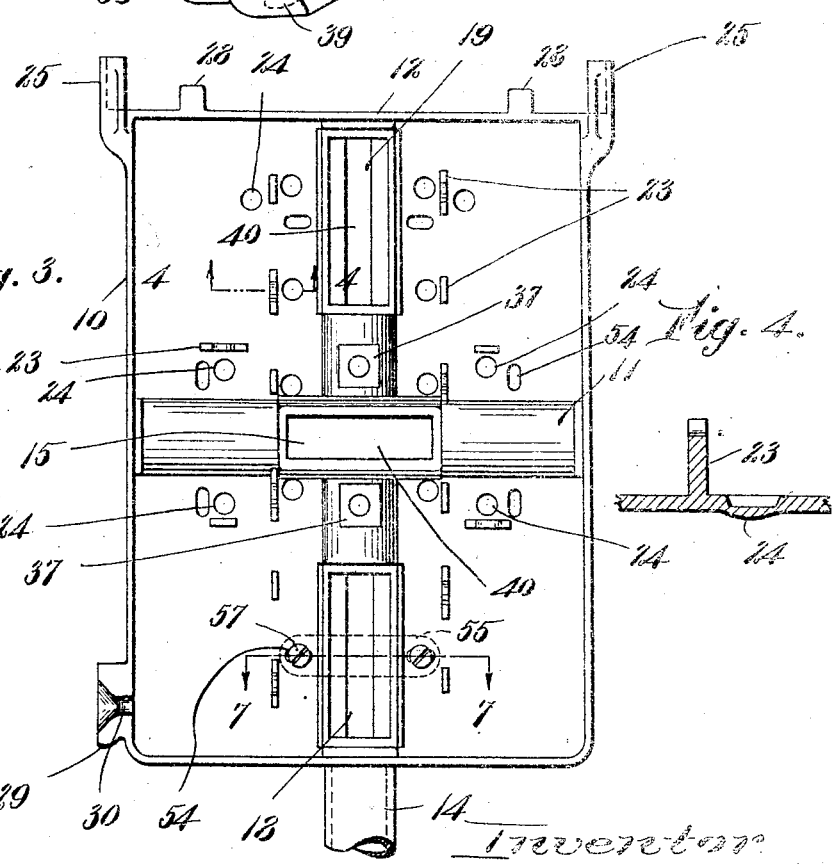

Feb. 17, 1925.
A. T. SAMPSON
1,526,870
SWITCH BOX
Filed Feb. 6, 1920
3 Sheets-Sheet 2
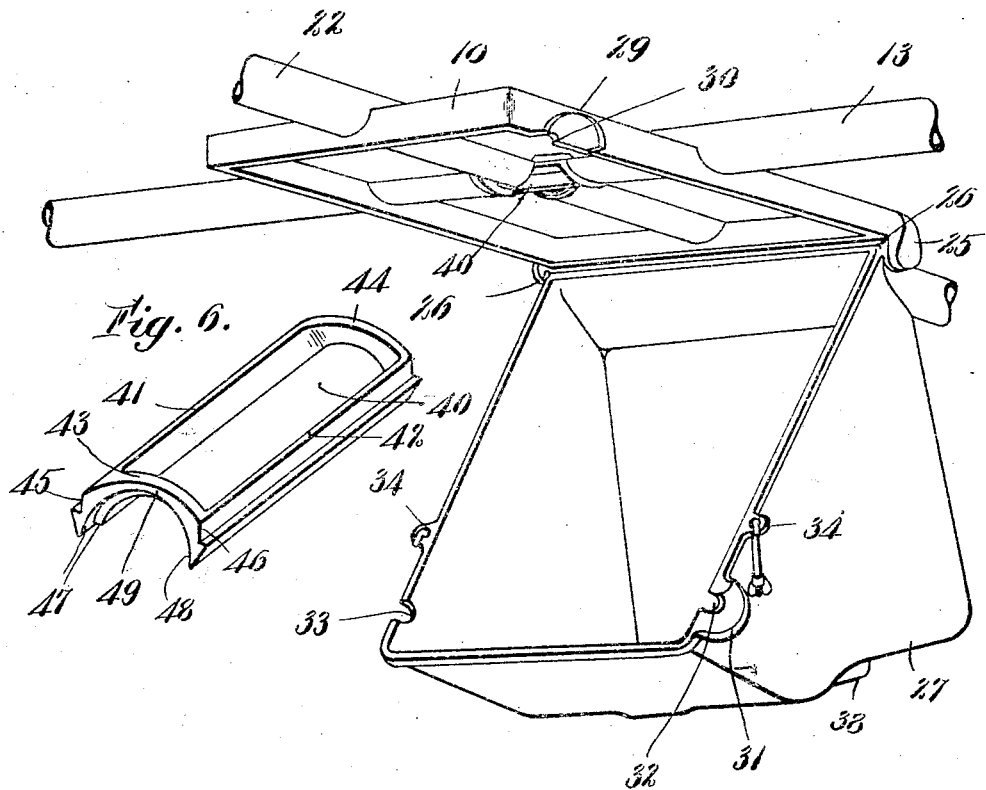
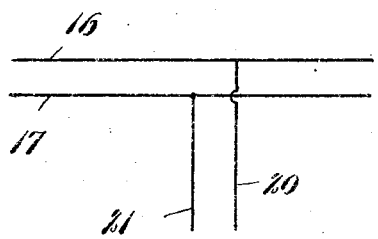
Inventor:
Archibald T. Sampson
by James R. Hodder
Att'y.

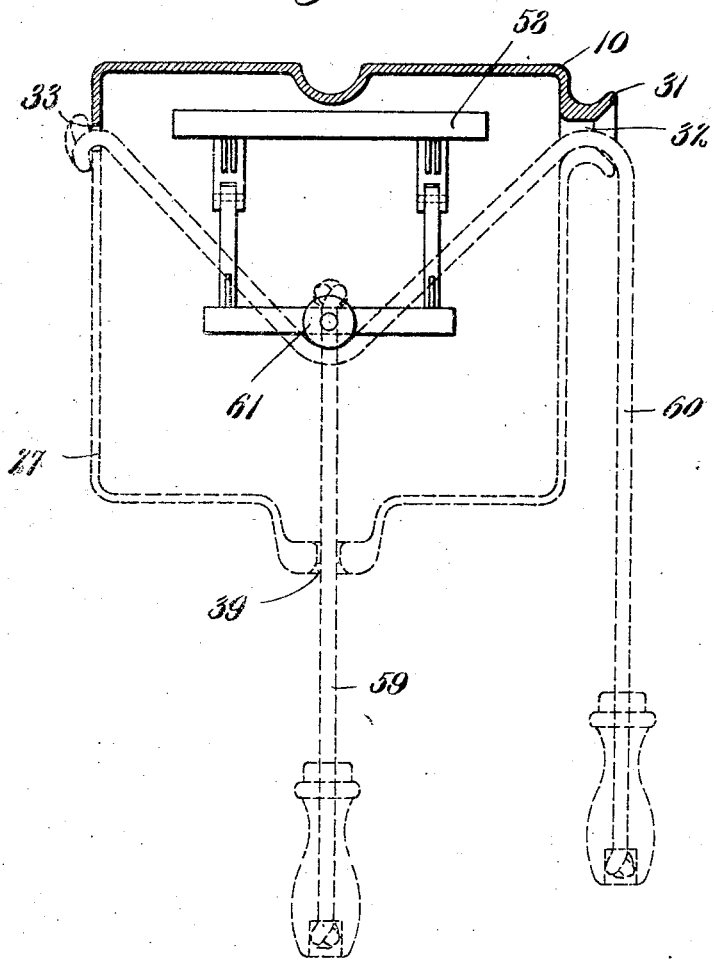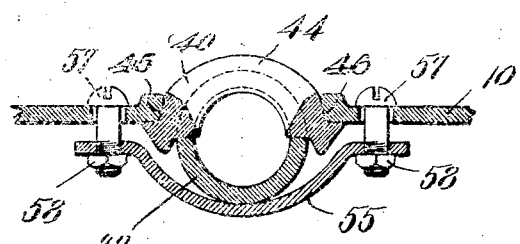

Patented Feb. 17, 1925.

1,526,870

UNITED STATES PATENT OFFICE.

ARCHIBALD T. SAMPSON, OF LYNN, MASSACHUSETTS, ASSIGNOR TO SAMPSON AXCESS SYSTEM, INC., OF LYNN, MASSACHUSETTS, A CORPORATION OF MASSACHUSETTS.

SWITCH BOX.

Application filed February 6, 1920. Serial No. 356,727.

*To all whom it may concern:*

Be it known that I, ARCHIBALD T. SAMPSON, a citizen of the United States, and resident of Lynn, in the county of Essex and State of Massachusetts, have invented an Improvement in Switch Boxes, of which the following description, in connection with the accompanying drawings, is a specification, like letters on the drawings representing like parts.

My present invention relates to boxes for switches or other circuit controlling devices, and more particularly to switch boxes adapted to be mounted in an overhead position on the conduits enclosing the electric conductors.

Heretofore in lighting and power circuit systems, as installed in buildings or the like, such as factories, warehouses, shops, etc., it has been necessary when tapping the main current conductors at any point, to install branch conduits extending from the tapping point to a switch or other circuit controlling device box in a convenient position on a wall, and further branch conduit from the switch box to the point where the current consuming device is located. Such a method of procedure is not only expensive, due to the time, labor, and material employed in the installation, but is also dangerous in that it adds to the amount of wiring in the system, and seriously complicates such system.

As the logical place for the circuit controlling devices is at the point most readily accessible for ready use, my devices are designed to be attached to and supported by the conduits anywhere along their length, or where it is desired to attach a branch conduit, and permits said branches or taps to be made without cutting off or taking down conduit or wires or even shutting off the current. Further, while I have shown a box designed to be placed at a cross of a pipe or conduit, it may be so designed as to be used on a straight line of conduit, a switch enclosed in the box operating to control the circuit as desired.

In the modern systems of electrical installation, the conductors are enclosed in a conduit that is substantial in character, and which, when installed, is a permanent fixture in the building or other structure. I have therefore arranged my present invention to be attached directly to the conduits; and although I have shown my improved device as being attached to the conduits located, as is usual, horizontally along the ceiling, it is within the spirit of my invention to be able to attach the same to conduits that are vertical and against the wall of the building.

As a multiplicity of devices for use with the different sizes of conduits adds to the amount of equipment that must be carried by a contractor or dealer, and adds materially to the expense of conducting business, as well as to the complexity of system, I have devised my improved device with the object in view of dispensing with as many different sizes of devices as is possible. With this object in view, I have devised my improved box so that but a single size of box may be applied to any of the commercial sizes of conduits. To this end, I provide fillers, a different size for each size of conduit, and which are interchangeable in the cut away portions of the box. These fillers not only serve to aline the box on the conduit, but serve to hold the box rigidly in position on the conduit.

As the circuit controlling devices, when enclosed in a box near the ceiling, are normally out of convenient reach, it is essential that means be provided for operating such devices from the floor, and I have therefore arranged my improved enclosing box with this end in view. Also, as at the present time there are many different styles of circuit controlling devices, I have arranged my improved enclosing box with easily removable portions arranged in such combinations as to enable practically all of the present types of controlling devices to be attached in position in the box with the least possible amount of work, keeping in mind always the desirable and essential features of ease and accessibility of making the connection between the main and branch conductors.

The principal object of my invention therefore, is the provision of an improved switch, or other circuit controlling box for electrical systems of distribution.

Another object of my invention is the provision of means, in a box of the above character, for operating, from a relatively distant point, the devices contained therein.

Still another object is the provision of means whereby any one of a plurality of different circuit controlling devices may be readily mounted in the box.

Other objects and novel features of construction and arrangements of parts will appear as the description of the invention progresses.

In the accompanying drawings illustrating the preferred embodiment of my invention, Fig. 1 is a perspective view of my improved box in position on the conduit attached to the ceiling of a building or other structure;

Fig. 2 is a perspective view, similar to Fig. 1, but with the cover in open position, for inspection or adjustment of the circuit controlling devices that may be installed therein;

Fig. 3 is a plan view of the base, or bottom, of the box, showing the arrangement for attaching the same to the conduits, and also showing the lay-out of the plurality of groups of easy removable portions, whereby any one of a plurality of circuit controlling devices may be mounted in the box.

Fig. 4 is a detail, on the line 4—4 of Fig. 3, showing the manner in which the easy removable portions are arranged;

Fig. 5 is a detail showing a typical wiring diagram at the connection point between the main and branch conductors;

Fig. 6 is a perspective view of the filler;

Fig. 7 is a sectional view, taken on the line 7—7 of Fig. 3; and

Fig. 8 is a view showing the switch in position on the base.

Referring to the drawings, 10 illustrates a base or bottom having semi-cylindrical passages 11 and 12 on one face thereof, and in which fit the main and branch conduits 13, 14 and 22 respectively. The passage 11 for the main conduit 13 is cut away at its central portion 15, to provide easy access to the main conductor 16 and 17 enclosed in said main conduit. The passage 12 is cut away near each end to provide openings 18 and 19 so that connection may be made with the branch conductors 20 and 21, contained in the branch conduit 14 or 22. This passage 12 may be considered to be a single passage having two openings 18 and 19 near each end or may, as would more commonly be the case, be considered as being two passages in alinement with each other, each passage extending from the cut away portion 15 in the passage 11, and each passage containing its own cut away portion.

Fillers 40 may be inserted in the cut away portions 15, 18 and 19, these fillers comprising parallelly arranged members 41 and 42 spaced apart and connected by end members 43 and 44 respectively. The members 41 and 42 are provided with faces or edges 45 and 46 and the distance between these faces or edges on all sizes of the fillers is constant, and of such size as to be a snug fit in the cut away portions 15, 18 and 19. The inner faces of the members 41 and 42 are cut away to define flat edges 47 and 48 and which rest against the cut away portion of the conduit. The distance between the outer portions of these edges 47 and 48 varies according to the size of the conduit with which they are to be associated, and is equal to the diameter of size conduit. The end members 43 and 44 are also provided with cut away portions 49, which is substantially circular in shape, as shown in Fig. 6, and abuts against the ends of the cut away portion of the conduit above described. By inserting a filler in either of the cut away portions 15, 18 or 19, the box is held solidly in position on a conduit against endwise or turning movement.

Formed integral with the base 10, by casting or in any other suitable manner, and on the inner face of the base, is a plurality of uprights 23, grouped as clearly shown in Fig. 3. Also formed integral with the base is a plurality of easy removable, or knock-out, portions 24, preferably circular in shape, and a plurality of easy removable, or knock-out portions 54, preferably elongated in shape. The portions 24 are easily removed by striking them a relatively sharp blow with a light punch, and when removed, expose a perforation through which a bolt or other fastening device may be passed. The grouping arrangement of the uprights 23 and knock-out portions 24, clearly shown in Fig. 3, was adopted as being the one that allowed the largest number of circuit controlling devices to be attached to the base.

The elongated knock-out portions 54 are so grouped with respect to the semi-cylindrical passages as to assist in positioning a clamping means for the conduits.

In the semi-cylindrical passage 12 and on each side of the cut away portion 15 in the passage 11, are struck-up portions 37 each containing one of the easy removable portions 24. These struck-up portions 37 form a recess for a nut or the head of a bolt that may be used to attach a device to a base 10, and therefore the conduit 14 or 22 firmly against the base 10. The removal of the portions 54, adjacent the passage 18 makes it possible to utilize a U-shaped clip 55 for securely attaching a conduit to the base 10. Reference to Fig. 7 will make clear the manner in which this last operation is performed. The knock-out portions 54 adjacent the lower end of the base 10, as viewed in Fig. 3, are removed, the conduit 14 placed in position, with one of the filler pieces 40 interposed between the cut away portion of the conduit and the base, and a clip 55 used, in connection with the bolts and nuts 57 and 58 respectively, to attach the conduit to the base.

At one end of the base, and at each side thereof, are ears or lugs 25, which are recessed to receive the hinge projections 26 extending outward or laterally from one end of the hollow cover 27. Projecting ears 28 on the end of the base are provided and act as stops for limiting the swinging movement of the cover 27 when the same is moved from its normal position shown in Fig. 2. On one side of the base and near the end thereof remote from the ears or lugs 25, is a semi-cylindrical projection 29 having a semi-cylindrical groove 30 therein. This projection 29 and groove 30 register with a corresponding projection 31 and groove 32 respectively, in one side of the cover 27, when the cover is in normal position, the grooves 30 and 32 defining a circular passage through which may pass an operating cord for the circuit controlling device attached to the base. A groove 33, on the opposite side of the cover 27 from the groove 32, and in alignment with said groove, acts as a stop for holding the end of the operating cord in position, the cord being knotted at the end for this purpose. On each side of the cover and near one end thereof, is a lug or ear 34, having a hole therein through which passes the hook ended bolt 35, having a wing nut 36 therein. When the cover is in normal position, as shown in Fig. 1, the hooked end of the bolts 35 engages with the edge of the base 10 to retain the base in position.

The cover 27 has a portion 38 forming an interior channel to provide space for the operating handle of the usual controlling device, as the handle of a knife switch. In the extreme outer, or lower end, of the cover, and at the bottom of the channel is a perforation 39, shown in dotted lines in Fig. 1, through which passes a second operating cord for the circuit controlling devices.

As shown in Fig. 1, the base 10 is clamped to the main conduit 13 in the manner described above, the conduit being cut away at the desired point to expose a short length of the conductors 16 and 17, the cutting apparatus described and claimed in my copending applications referred to being used in such operation. The branch conduit 14 or 22, or both of them, are now clamped in position in the passage 12, with the cut away portions, made by the cutting apparatus above referred to, registering with the cut away portions 18 and 19. The appropriate portions 24 are removed from the base, and the desired current controlling device attached to the base by bolts that pass through the holes made by the removal of the portions 24. Assuming that a single throw double pole knife switch 58 is employed as a controlling device, it is fastened in position on the base, the proper connections made to extend the circuit from the main to the branch conductors 16, 17, and 20, 21, respectively, the cover 27 hung on the lugs 25 and occupying, at this stage, the position shown in Fig. 2, one operating cord 59 attached to the switch handle 61 and the free end passed through the perforation 39 and allowed to hang downward to within convenient reach of the operator. A second operating cord 60 is knotted at one end and this end forced into the passage 33, the cord led across the cover and through the passage 32, and then led downward into convenient reach of the operator. The cover 27 is now swung upward about its hinge and into the normal position as shown in Fig. 1, when the hook ended bolts 35 and wing nuts 36 are employed to securely fasten the cover in place.

The switch blade may be moved to break the circuit between the main and branch conductors by pulling downward on the cord extending through the perforation 39, or may be moved into position to complete the circuit through the main and branch conductors by pulling downward on the cord extending through the registering passages 32 and 30.

This means of attachment to a switch is a means of controlling that permits of very rough usage without causing any injurious strains on the switch or other devices. The cords make an elastic pull that causes a quick make and break of the switch blades with the contacts. The method of opening conduits and attaching bases thereto is new and covers a wide range of use, and is one that permits of great economy in construction. It is of particular advantage in service entrances, meter connections, and distributing points, and permits of all devices and attachments being supported by the conduits which cover the conductors, thereby requiring few attachments to buildings. The covers are readily removable by their bayonet hinges, so that they can be easily hung any place or removed, thus giving the advantage that when making repairs or connections, the devices and apparatus are approachable from all points but the back. This avoids danger from shocks, and permits quick and safe repairs while current is on.

From the above it will be evident that my improved circuit controlling device box is simple in construction, readily and securely applied to existing power and lighting circuit systems at the desired point and in the most advantageous position, that controlling devices of varied character may be employed in connection therewith, and that such devices may be rapidly and accurately operated to perform their functions. In describing this preferred embodiment of my invention, I have necessarily described it somewhat in detail, but it is to be understood that I may vary the size, shape, and arrangement of parts that go to make up my device, within wide limits without departing from the spirit of the invention.

The controlling ropes may be led to any convenient point within reach of the operator, and the operating portions thereof, being within the enclosing box, cause a make and break of the switch to which they are attached, and prevents the side strain on the pivots of the switches.

The switch base, being mounted on projections on the base of the box, is spaced apart from said switch box base a sufficient distance to allow the conductors to be led behind the switch base, which is of great advantage in connecting up the switch, and also provides better insulation of the switch.

The cover, being the practical equivalent of a box, while the base is the practical equivalent of a cover, it will be readily seen that when the cover is swung on its hinges downward out of the way of the base and parts mounted thereon, that all parts of the apparatus may be readily inspected and worked on from all sides. The hinges, being of the bayonet type, hold the cover firmly in position, and yet allow the cover to be removed bodily from the base. Again, while the cover can be opened without disconnecting the switch, the switch cannot be operated from open to closed position while the cover is in open position.

The filler piece is preferably made with rounded edges and acts as a bushing to cover up any sharp edges of the cut away slot in the conduit to which the base may be attached.

Having thus described my invention, what I claim as new and desire to secure by Letters Patent, is:—

1. In a device of the class described, the combination of a base, means for positioning said base on and attaching it to a conduit, a plurality of means, arranged in groups on one face of the base removable to allow the attachment of any one of a plurality of different types of current control devices thereto, an enclosing cover hinged to the base at one end thereof, and provided with a plurality of perforations in said cover through which operating cords for the current control devices extend, and means for securing said base and cover together.

2. In a device of the class described, the combination of a base, means for positioning said base on and attaching it to an electric conductor conduit, means for positioning and attaching an electric conductor conduit to the base, said base being provided with perforations in alignment with openings in said conduits, and through which electric connection may be made with the conductors in the conduits, an enclosing cover hinged to the base at one end thereof, and provided with a plurality of perforations in said cover through which operating cords for a current control device extend, and means for securing said base and cover together.

3. In a device of the class described, the combination of a base, a groove in one face of said base extending throughout the length thereof, and provided with a perforation in the groove intermediate the ends thereof and through which connection may be made with conductors in a conduit, a second groove in the base at right angles to the first groove, and extending across the width of the base, means, including said second groove, for attaching a second conduit to the base, said last named groove being provided with perforations on either side of its intersection with the first said groove, and through which connection may be made with the conductors in said second conduit, a plurality of means arranged in groups on one face of the base removable to allow the attachment of any one of a plurality of different types of current control devices thereto, an enclosing cover hinged to the base at one end thereof, and means for securing said base and cover together.

4. The combination of a switch box having a rectangular opening therein, of a conduit having a cooperating slot therein, of means interposed between said box and said conduit, registering with the rectangular opening and slot, for preventing relative movement of the box and conduit.

5. In a device of the class described, the combination of a conduit having a slot therein, a base provided with a slot, said conduit and base being adapted to be placed in operative relation to each other and with the slot in the base in alinement with the slot in the conduit, and a frame engaging with the edges of the slots in both conduit and base.

6. The combination of a switch box having an opening therein, of a conduit having an operating slot therein, of means interposed between said box and said conduit, registering with the operating slot, for preventing relative movement of the box and conduit.

In testimony whereof, I have signed my name to this specification, in the presence of two subscribing witnesses.

ARCHIBALD T. SAMPSON.

Witnesses:
JAMES R. HODDER,
J. ALAN HODDER.